United States Patent
Viswanathan et al.

(10) Patent No.: US 6,764,617 B1
(45) Date of Patent: Jul. 20, 2004

(54) FERROMAGNETIC CONDUCTING LIGNOSULFONIC ACID-DOPED POLYANILINE NANOCOMPOSITES

(75) Inventors: Tito Viswanathan, Little Rock, AR (US); Brian Berry, Benton, AR (US)

(73) Assignee: The United States of America as represented by the Administrator of the National Aeronautics & Space Administration, Washington, DC (US)

( * ) Notice: Subject to any disclaimer, the term of this patent is extended or adjusted under 35 U.S.C. 154(b) by 413 days.

(21) Appl. No.: 09/994,996

(22) Filed: Nov. 16, 2001

Related U.S. Application Data
(60) Provisional application No. 60/249,563, filed on Nov. 17, 2000.

(51) Int. Cl.[7] .............................. H01B 1/12; G21F 1/00; B05D 5/12
(52) U.S. Cl. ................ 252/500; 252/521.2; 250/515.1; 250/517.1; 427/128; 427/160; 427/180; 428/457; 428/922; 428/928
(58) Field of Search .............................. 252/500, 521.2; 528/210, 422; 250/515.1, 517.1; 427/160, 128, 180; 428/457, 922, 928

(56) References Cited

U.S. PATENT DOCUMENTS

| | | | |
|---|---|---|---|
| 4,731,408 A | 3/1988 | Jasne | |
| 5,408,034 A | 4/1995 | Galaj et al. | |
| 5,578,249 A | 11/1996 | Ohtani et al. | |
| 5,716,550 A | 2/1998 | Gardner et al. | |
| 5,866,043 A | 2/1999 | Ikkala et al. | |
| 5,910,385 A | 6/1999 | Gardner et al. | |
| 5,938,979 A | 8/1999 | Kambe et al. | |
| 5,968,417 A | 10/1999 | Viswanathan | |
| 6,030,551 A | 2/2000 | Ho et al. | |
| 6,059,999 A | 5/2000 | Viswanathan | |
| 6,136,909 A | 10/2000 | Liao et al. | |
| 6,231,789 B1 * | 5/2001 | Hawkins et al. | 252/512 |
| 6,277,303 B1 | 8/2001 | Foulger | |
| 6,299,800 B1 * | 10/2001 | Viswanathan | 252/500 |
| 6,440,332 B1 * | 8/2002 | Geer et al. | 252/512 |
| 6,569,651 B1 * | 5/2003 | Samuelson et al. | 435/128 |
| 6,627,117 B2 * | 9/2003 | Geer et al. | 252/512 |

* cited by examiner

Primary Examiner—Mark Kopec
(74) Attorney, Agent, or Firm—Gary G. Borda; Randall M. Heald; John G. Mannix (57) ABSTRACT

A conductive ferromagnetic composition of matter comprising sulfonated lignin or a sulfonated polyflavonoid, or derivatives thereof, and ferromagnetic iron oxide particles is disclosed. Among the uses of the composition is to shield electromagnetic radiation. The ferromagnetic iron oxide particles of the composition are surprisingly stable to acid, and are easily and inexpensively formed from iron cations in solution.

75 Claims, 3 Drawing Sheets

FERROMAGNETIC CONDUCTING LIGNOSULFONIC ACID-DOPED POLYANILINE NANOCOMPOSITES

PRIORITY OF INVENTION

This application claims priority under 35 U.S.C. § 119(e) from U.S. Provisional Patent Application No. 60/249,563, filed Nov. 17, 2000. +gi

GOVERNMENT FUNDING

The invention described herein was made in the performance of work under a NASA contract and is subject to the provisions of Public Law 96-517 (35 U.S.C. § 202) in which the contractor has elected not to retain title.

BACKGROUND OF THE INVENTION

Polyaniline is the most studied inherently conducting polymer (ICP) because it is inexpensive and relatively easy to synthesize. Polyaniline, however, is limited by its processability [Gregory, Richard V., Chapter 18: *Solution Processing of Conductive Polymers: Fibers and Gels from Emeraldine Base Polyaniline* in Handbook of Conducting Polymers, Eds. Skotheim, Terje A.; Elsenbaumer, Ronald L.; Reynolds, John R.; Marcel Dekker Inc., (1998) p. 437.]. Lignosulfonic acid-doped polyaniline (ligno-pani), however, is processable due to the grafting of polyaniline onto lignosulfonic acid, which is highly soluble in water [Viswanathan, T., "Conducting Compositions of Matter", U.S. Pat. No. 5,968,417 (1999); and Sudhakar, M. et al. Chapter 6. *Conducting Waterborne Lignosulfonic Acid-Doped Polyaniline* in Semiconducting Polymers, eds. Hsieh, Bing, R.; Wei Yen; American Chemical Society, (1999) p. 76. ]. Only recently has magnetic conducting polyaniline been reported. The most common method of making magnetic polyaniline involves incorporating iron oxide crystals (such as $Fe_2O_3$ [Tang, Ben Zhong et al., *Chem. Mater.* (1999) 11, 1581] or $Fe_3O_4$ [Wan, M. et al., *J. Polym. Sci. Part A*. 1998. 36. 2799]) into the conducting material [Kambe et al., U.S. Pat. No. 5,938,979 (1999)]. These methods, however, require use of organic solvents and the expensive process of laser pyrolysis to form the iron oxide particles. Furthermore, the $Fe_3O_4$ ferromagnetic nanoparticles incorporated in the polyaniline decompose when exposed to the strong acids used to dope the polymer. This is a major problem since most conducting polymers need to be doped with strong acids such as hydrochloric acid in order to make them conductive. Another problem is the difficulty of sythesizing complex co-polymers [Fan, J. et al., *Solid State Commun.* (1999) 110, 57]. Finally, pure polyaniline polymers doped with ferromagnetic material [Wan, M. et al., *J. Polym. Sci. Part A*. (1998) 36, 2799] is likely not processable due to the limited dispersibility of polyaniline in aqueous solvents and water-soluble resins.

There is currently a need for ferromagnetic conducting polymers which are dispersible in water-soluble resins, inexpensive to synthesisize, and stable in acid.

SUMMARY OF THE INVENTION

The present invention provides a conducting ferromagnetic material of the invention comprising ferromagnetic iron oxide particles and a conducting polymer comprising lignosulfonic acid-doped polyaniline. The material of the invention has the advantage of being easily and inexpensively synthesized by dispersing iron cations in aqueous solvents comprising the conducting polymers. In addition, the iron oxide particles in the materials of the invention have improved acid stability compared to the iron oxide particles incorporated in polyaniline polymers. The conducting polymer component of the invention also has the advantage of being easily synthesized from common and inexpensive starting materials. The conducting ferromagnetic material of the present invention also has the advantage of being dispersible in aqueous solvents or water-based resins. This makes the materials more easily processable and helps to minimize pollution from the use of organic solvents.

The invention provides a conductive ferromagnetic composition of matter comprising: (a) linearly conjugated π-systems; (b) residues of sulfonated lignin or a sulfonated polyflavonoid or a derivative of a sulfonated lignin or a sulfonated polyflavonoid; and (c) ferromagnetic iron oxide particles.

The invention further provides a barrier to electromagnetic radiation comprising: (a) linearly conjugated π-systems and residues of sulfonated lignin or a sulfonated polyflavonoid or a derivative of a sulfonated lignin or a sulfonated polyflavonoid; and (b) ferromagnetic iron oxide particles.

The invention further provides an apparatus comprising: a substrate; and a ferromagnetic layer on the substrate, wherein the ferromagnetic layer comprises (a) linearly conjugated π-systems; (b) residues of sulfonated lignin or a sulfonated polyflavonoid or a derivative of sulfonated lignin or a sulfonated polyflavonoid; and (c) iron oxide particles.

The invention further provides a method of shielding an article from electromagnetic radiation; comprising the step of interposing an electromagnetic shielding material between the article and one or more sources of electromagnetic radiation; the electromagnetic shielding material comprising: (a) linearly conjugated π-systems; (b) residues of sulfonated lignin or a sulfonated polyflavonoid or a derivative of sulfonated lignin or a sulfonated polyflavonoid; and (c) ferromagnetic iron oxide particles.

The invention further provides a method for preparing a conductive ferromagnetic composition of matter comprising combining (1) a polymer comprising (a) linearly conjugated π-systems, and (b) sulfonated lignin or a sulfonated polyflavonoid or a derivative of sulfonated lignin or a sulfonated polyflavonoid; and (2) a source of ferromagnetic iron oxide particles.

The invention further provides a conductive ferromagnetic composition of matter formed by a process comprising combining (1) a polymer comprising (a) linearly conjugated π-systems, and (b) sulfonated lignin or a sulfonated polyflavonoid or a derivative of sulfonated lignin or a sulfonated polyflavonoid; and (2) a source of ferromagnetic iron oxide particles.

The invention further provides a method of forming a conductive ferromagnetic composition of matter comprising: combining in a mixture (1) a polymer comprising (a) linearly conjugated π-systems, and (b) sulfonated lignin or a sulfonated polyflavonoid or a derivative of sulfonated lignin or a sulfonated polyflavonoid; and (2) ferrous ions; and (3) an aqueous solvent; and adding a base to adjust the pH of the mixture to at least about 7.

The invention further provides a conductive ferromagnetic composition of matter formed by a process comprising: combining in a mixture (1) a polymer comprising (a) linearly conjugated π-systems, and (b) sulfonated lignin or a sulfonated polyflavonoid or a derivative of sulfonated lignin or a sulfonated polyflavonoid; and (2) ferrous ions; and (3) an aqueous solvent; and adding a base to adjust the pH of the mixture to at least about 7.

The conducting ferromagnetic compositions of the present invention can be used for many purposes. They can be used, for example, as barriers to absorb or filter electromagnetic radiation. They can be used as electronic data storage materials. They can also be used as coatings to protect metals against corrosion, as described in U.S. patent application Ser. No. 09/903,260, which is hereby incorporated by reference. They can also be used as anti-static coatings or components of fibers and fabrics as disclosed in U.S. Pat. No. 6,059,999, which is hereby incorporated by reference.

DETAILED DESCRIPTION OF THE INVENTION

The field of electrically conducting organic polymers is dominated by two types of molecular structures: linearly conjugated π-systems and charge-transfer complexes, which form stacks of B-systems in the solid state. In linearly conjugated π-systems, electrons move rapidly along a partially oxidized or reduced molecular chain. The conjugated region of an individual linearly conjugated π-systems should preferably extend so that when the conjugated region of one linearly conjugated π-systems is adjacent to the conjugated region of another linearly conjugated π-systems, and an electric field is applied, an electron can flow from the first linearly conjugated π-systems to the adjacent linearly conjugated B-system.

Examples of linearly conjugated π-systems include polymers comprising substituted and unsubstituted aromatic and heteroaromatic rings (e.g., 5 or 6 membered aromatic and heteroaromatic rings). Preferably, the rings will be linked into a continuous conjugated B-electron network, such as those present in polyaromatic or poly(pseudo-aromatic) systems. For example, see U.S. Pat. No. 5,423,956 at columns 1, 4, and inter alia.

Specific linearly conjugated π-systems comprise one or more conjugated regions composed of monomeric units incorporating a conjugated "basic atom" that can form the positive part of an ionic couple. The preferred basic atom is nitrogen. Other basic atoms include sulfur. For example, linearly conjugated π-systems can be composed entirely of, or comprise, repeating monomer units of aniline, thiophene, pyrrole, and/or phenyl mercaptan. Linearly conjugated π-systems useful in the present invention also include linearly conjugated π-systems of repeating monomer units of aniline, thiophene, pyrrole, and/or phenyl mercaptan that are ring-substituted with one or more (e.g. 1, 2, or 3) straight or branched alkyl, alkoxy, or alkoxyalkyl groups, wherein the alkyl, alkoxy, or alkoxyalkyl groups each contain from 1 up to about 10 carbon atoms, or preferably from 1 to 6 carbon atoms, or more preferably from 1 to 4 carbon atoms. Linearly conjugated π-systems that can be prepared by oxidation-type polymerization are preferred.

The linearly conjugated π-systems of the compositions of matter of the present invention can also be copolymers of any one or more of the above monomers with other co-monomers having ethylenic unsaturation, such as, ethylene, propylene, vinyl chloride, styrene, vinyl alcohol, or vinyl acetate. In such cases, the conjugated region or regions containing the basic monomeric units should comprise a block sufficiently long that the composition of matter is conductive.

A linearly conjugated π-systems can typically comprise 3 to 100 monomer units. Preferred linearly conjugated B-systems comprise 5 to 50 monomer units, and more preferred linearly conjugated B-systems comprise 10 to 30 monomer units.

One preferred class of linearly conjugated π-systems is the polyanilines. Polyanilines have been extensively studied because of their unique chemical, electronic, and optical properties. Thus, the polyanilines represent a well known class of substances in the polymer field. For a detailed description of polyanilines, see U.S. Pat. No. 5,164,465, columns 1–3. The linearly conjugated B-systems of the composition of matter of the invention are preferably polyaniline chains. Other preferred classes of linearly conjugated B-systems are the polypyrroles (A. F. Diaz et al. *J. Chem Soc. Chem. Commun.*, 1979, 635, 854; and G. Tourilion et al. *J. Phys. Chem.*, 1987, 87, 2289), and the polythiophenes (G. Tourilion *J. Electroanal Chem.* 1984, 161, 51).

Lignin is a principal constituent of the wood structure of higher plants, and ranks second to cellulose as the most abundant organic material. Lignin from coniferous trees is a polymeric substance resulting from the random combination of the products of an enzymatically induced oxidation (dehydrogenation) of coniferyl alcohol. In deciduous trees, lignin comprises structures from the polymerization of both coniferyl alcohol and sinapyl alcohol. Additionally, the lignin polymer may comprise functional groups such as hydroxy, methoxy, and carboxy groups. See "Kirk-Othmer Concise Encyclopedia of Chemical Technology;" A Wiley-Interscience publication; 1985; page 699; Abridged version of the 24 volume Encyclopedia of Chemical Technology. 3rd ed. New York: Wiley, c1978–c1984; executive editor Martin Grayson.

The term "derivative" includes derivatives of sulfonated lignin and of sulfonated polyflavonoids containing one or more hydroxy, methoxy, ethoxy, hydroxymethyl, or 2-hydroxyethyl substituents.

A specific example of sulfonated polyflavonoids is sulfonated tannin.

The term "dispersible" means that the material can be suspended in the solvent to the extent that particles are not visible with the naked eye.

"Water-borne resins" are resins that are soluble or dispersible in water. "Organic solvent-borne resins" are resins that are soluble or dispersible in organic solvents.

Iron oxide particles are particles composed of iron and oxygen. They may be crystalline or amorphous. Preferably, the iron oxide particles are less than 1000 nm in diameter. Specific iron oxide particles may have an average diameter of from about 5 nm to about 50 nm or from about 33 to about 45 nm or from about 33 to about 105 nm.

"Magnetitite" refers to the substance $Fe^{2+}Fe^{3+}_2O_4$, or $Fe_3O_4$.

The term "alpha-$Fe_2O_3$" refers to hematite.

The term "gamma-$Fe_2O_3$" refers to maghemite.

"Stable at pH X" means that the material is still attracted to a magnet after a 2 min wash in aqueous solvent at the given pH. Preferably, the materials maintain at least 90% of their conductivity and magnetic susceptibility after a 2 min wash in aqueous solvent at the given pH. More preferably the materials maintain at least 97% of their conductivity and magnetic susceptibility after a 2 min wash in aqueous solvent at the given pH.

The sulfite process of the paper and wood-pulp industries yields a spent liquor that comprises sulfonated lignins (i.e., lignosulfonates). Lignosulfonates are used as dispersants, binders, emulsion stabilizers, complexing agents, and for other applications. Lignosulfonates are abundant, inexpensive polyaryl-sulfonic acids that are highly soluble in water. The aryl rings of lignosulfonate polymers may comprise a variety of functional groups (e.g. hydroxy, methoxy and carboxy groups) that can be cross-linked after polymerization. Additionally, lignosulfonates comprise multiple sulfonic acid groups that can be used for doping polymers. Lignosulfonates can also be readily converted into their corresponding sulfonic acid derivatives, which are disclosed herein to be useful templates and reagents for oxidative polymerization reactions.

Lignosulfonates are available from a number of commercial sources. In general, lignosulfonates from any source can be used to prepare the compositions of matter of the invention provided they are free of impurities that interfere with polymerization reaction conditions. Specifically, "Lignosulfonic acid, ethoxylated, sodium salt (CAS Registry Number 68611-14-3, "REAX 825E")," available as REAX 825E from Westvaco, Chemical Division, Polychemicals Department, P.O. Box 70848, Charleston Heights, S.C. 29415-0848, can be used to prepare the compositions of matter of the invention. REAX 825E has the chemical formula: $[(CH_3O)(HOC_2H_4O)Ar(CH_2SO_3Na)_x(C_3H_5SO_3Na)_y]_z$. "Ammonium Lignosulfonate; WANIN AM (Powder) (CAS Registry Number 8061-53-8, "WANIN")" available from LIGNOTECH USA, INC., Research and Development, 100 Highway 51 South, Rothchild, Wis., 54474-1198, can also conveniently be used to prepare the compositions of matter of the invention.

Another class of polyaryl-sulfonic acids that are readily available and highly water soluble are the sulfonated polyflavanoids (e.g. sulfonated condensed tannins). Condensed tannins are used extensively in the commercial preparation of adhesives and resins (Wood Adhesives: Chemistry and Technology; A. Pizzi; Marcel Dekker, Inc., New York, (1983), chapter 4). Sulfonated polyflavonoids like lignosulfonate, comprise polyaryl rings that comprise a variety of functional groups that can be cross-linked after polymerization. In particular, sulfonated polyflavonoids have a polyhydroxylated-sulfonated-polyaryl ring structure that make them ideal templates and reagents for preparing the compositions of matter of the invention.

The sulfonated lignins and sulfonated polyflavonoids share common structural features that make them especially useful for preparing the compositions of matter of the invention. It is understood that preferred reagents for preparing the compositions of matter of the invention comprise substituted sulfonated polyaryl rings. Thus, it is understood that, in general, sulfonated-polyaryl compounds, wherein the aryl rings are substituted with hydroxy, methoxy, ethoxy, hydroxymethyl, 2-hydroxyethoxy, 2-[(N-1,1-dimethyl-2-sulfoethylamino)carbonyl]ethyl (i.e., $—CH_2CH_2CONHC(CH_3)_2CH_2SO_3H$), or 2-carboxyethyl substituents can be used as a templates or reagents for preparing the conductive polymer compositions. Lignin with 2-[(N-1,1-dimethyl-2-sulfoethylamino)carbonyl]ethyl or 2-carboxyethyl substituents arise by derivatization of lignin with, respectively, 2-acrylamido-2-methyl-1-propanesulfonic acid or acrylic acid. These two derivatized forms of lignin were obtained from Georgia Pacific.

Within the compositions of matter of the invention, the sulfonated polyaryl compounds (e.g. the sulfonated lignins or sulfonated polyflavonoids) can be attached to the linearly conjugated B-systems by ionic or covalent bonds, as well as through electrostatic interactions (e.g. hydrogen bonds). Thus, the term "residue of," as used herein with respect to a sulfonated polyaryl compound, comprises a radical and/or an ion of the sulfonated polyaryl compound that is attached (ionically, covalently, or electrostatically), at one or multiple sites, to one or more linearly conjugated B-systems.

Specific and preferred values listed below for radicals, substituents, and ranges, are for illustration only; they do not exclude other defined values or other values within defined ranges for the radicals and substituents.

The molecular weight of the conductive polymers incorporated in the coatings of the present invention can vary over a large range and may be virtually any value, depending on the desired application. Thus, the conductive polymers in the coatings of the invention may typically have a molecular weight on the order of about 5,000 to 200,000. Specific conductive polymers in the coatings of the invention may have a molecular weight on the order of about 10,000 to about 100,000; and preferred conductive polymers have a molecular weight of about 15,000 to about 50,000.

The preparation of the conductive polymers of the invention can conveniently be carried out by combining a sulfonated lignin or a sulfonated polyflavonoid, with the desired monomer (or co-monomers), an effective amount of an initiator, and a solvent.

The monomer can be selected with regard to the desired final polymer. Suitable monomers include aniline, o-ethylaniline, m-ethylaniline, o-ethoxyaniline, m-butylaniline, m-hexylaniline, m-octylaniline, 4-bromoaniline, 2-bromoaniline, 3-bromoaniline, 3-acetamidoaniline, 4-acetamidoaniline, 5-chloro-2-methoxyaniline, 5-chloro-2-etboxyaniline, 2,5-dimethylaniline, 2,3-dimethylaniline, 2,5-dibutylaniline, 2,5-dimethoxyaniline, tetrahydronaphthylamine, 2-cyanoaniline, 2-thiomethylaniline, 3-(n-bytanesulfonic acid)aniline, 2,4-dimethoxyaniline, 4-mercaptoaniline, 4-methylthioaniline, 3-phenoxyaniline, 4-phenoxyaniline, thiophene, pyrrole, and thiophenol. Preferred monomers useful in the methods of the invention include aniline, o-methoxyaniline, and o-ethoxyaniline. Another preferred monomer is pyrrole.

Suitable solvents include polar liquids in which lignosulfonic acid, the monomer, and the final conductive polymers are soluble. Examples of suitable solvents include water or alkanols (e.g. methanol, ethanol, propanol, and isopropanol), dimethylsulfoxide, tetrahydrofuran, dimethyl formamide, N,N'-dimethylacetamide, NMP, or any combination thereof. A preferred solvent is water.

Suitable initiators include any material capable of initiating the oxidation polymerization, for example, hydrogen peroxide, iron trichloride, potassium permanganate, potassium persulfate, and other such oxidizing agents. When the monomer to be polymerized is an aniline, the preferred initiator is ammonium persulfate.

The polymerization reactions can be carried out at a suitable temperature, for example, a temperature in the range of about −10 to 100 EC. Preferably, the polymerization is carried out at a temperature in the range of about 0 to 30 EC, and more preferably, at about 0 to 5 EC.

The polymerization reaction can conveniently be carried out using monomers and sulfonated aryl polymers in a wide range of weight ratios. Conveniently, approximately a (1–5):1 weight ratio of sulfonated aryl polymer and monomer can be used (e.g. a 1:1 ratio). However, for the preparation of the composition of matter comprising lignosulfonic acid and polyaniline chains, higher conductivities were obtained when lignosulfonic acid and aniline were combined in a 0.125:1 weight ratio. It may be prefered to carry out the polymerization reaction using about, a (0.01–1):1, or preferably about a (0.1–0.5):1, weight ratio of lignosulfonic acid to monomer. In general, the higher the relative concentration of lignosulfonic acid, the greater the solubility of the resulting composition of matter.

As used herein, the term "conductive polymer" means a polymer capable of being conductive when mixed with the proper dopant. Dopants can be either n-type or p-type. A common p-type dopant is an acid, such as hydrochloric acid, sulfuric acid, p-toluenesulfonic acid, etc.

The term "aqueous solvent" means a solvent comprising water.

Sulfonated lignin and sulfonated polyflavonoids are useful templates for carrying out polymerization reactions yielding conducting compositions of matter comprising conjugated B-systems. Sulfonated lignin and sulfonated polyflavonoids are superior to other polymerization templates due to their very high solubility in water, their cross-linkability, their relative abundance, their low cost, and because of the availability of the pendent sulfonic acid groups for doping the resulting polymers.

The conjugated π-systems can be grafted (i.e. covalently bonded) to sulfonated lignin or sulfonated polyflavonoids. While not wishing to be bound by theory, it is believed that this grafting results from the formation of radical species of the sulfonated polymers, which subsequently initiate aniline polymerization, and are thereby covalently incorporated into the resulting compositions of matter. It is believed that sulfonated polymers bearing aryl-hydroxy groups (e.g. lignin sulfonic acid and sulfonated polyflavonoids), are particularly likely to form grafted products. Additionally, because the sulfonated lignin or sulfonated polyflavonoids are incorporated into the reaction product, the conducting polymers incorporated in the coatings of the invention possess advantageous properties over other conductive compositions of matter. For example, the conductive polymers of the invention comprising polyaniline chains grafted to sulfonated lignin or sulfonated polyflavonoids are highly cross-linkable due to the presence of the sulfonated lignin or sulfonated polyflavonoids, which are substituted with a variety of functional groups.

Halo is fluoro, chloro, bromo, or iodo. Alkyl, alkoxy, alkoxyalkyl, etc. denote both straight and branched groups; but reference to an individual radical such as "propyl" embraces only the straight chain radical, a branched chain isomer such as "isopropyl" being specifically referred to.

$(C_1-C_6)$alkyl can be methyl, ethyl, propyl, isopropyl, butyl, iso-butyl, sec-butyl, pentyl, 3-pentyl, or hexyl. $(C_1-C_6)$alkoxy can be methoxy, ethoxy, propoxy, isopropoxy, butoxy, isobutoxy, sec-butoxy, pentyloxy, or hexyloxy.

A binder can be any substance capable of binding or encasing the conductive ferromagnetic materials of the invention without detrimentally affecting their intended use. Exemplary binders include polymers. Appropriate polymers include vinyl and non-vinyl polymers. Appropriate vinyl polymers include, for example, polyolefins such as polyethylene and polypropylene; fluoropolymers, such as polytetrafluoroethylene and polyvinyl fluoride, and copolymers and mixtures thereof Appropriate non-vinyl polymers include, for example, polyesters such as polymethylmethacrylate and polyurethane.

The polymers include various property modifiers to improve processing or durability, such as plasticizers and antioxidants. Small quantities of other particulate fillers can be used to improve the mechanical properties or the electrical conductivity, if desired. In addition, the binder can include conducting particles such as carbon fibers, carbon black, graphite, or metal particles.

Alternatively, soft metals such as indium and gold, can act as binders. The materials can be embedded into the soft metals. If the metals have melting points below the melting point of the ferromagnetic iron oxide particles, the materials can be mixed with the melted metal and formed into a desired shape.

The binder can also be a film-forming resin. The term "film-forming resin" is understood in the art. A film-forming resin is a resin capable of forming a continuous polymer network in a thin film when spread on a surface. The films of the invention may be any thickness suitable for the use of the material, such as to protect against corrosion or to shield electromagnetic radiation. Preferred thicknesses after drying are in the range of about 0.1 to about 20 mils. Especially preferred thicknesses are in the range of 1–10 mils. Suitable film-forming resins include polyurethanes, epoxies, neutral resins, acidic resins, acrylates, polyesters, glycidyl acrylates, polyamides, polyimides, poly(amide-imides), polyaramids, polycarbonates, and polyvinylfluoride, formaldehyde-based resins, and combinations thereof The film-forming resins can be in the range of 10% to 99% by volume of the compositions, preferably in the range of 30% to 97% by volume of the compositions.

The resins of the invention can be water-borne or organic solvent-borne. Water-borne resins are resins that are soluble or dispersible in water. Organic-solvent-borne resins are resins that are soluble or dispersible in organic solvents.

The conducting ferromagnetic compositions of the present invention comprising a film-forming resin can be latex compositions. Preferred latexes are water-based.

The term "barrier to electromagnetic radiation" refers to an object, or a layer on an object, that absorbs frequencies or types of electromagnetic radiation that are of interest. The barrier may absorb substantially all electromagnetic radiation in the frequency range of interest. In addition, the barrier may operate as a filter, absorbing a fraction of the electromagnetic radiation in the frequency range of interest.

The size of the ferromagnetic particles can be selected to absorb electromagnetic radiation in a desired frequency range, preferably in a relatively high frequency range. A mixture of sizes can be used if a broader range of absorption is desired than is obtained with a single batch of particles.

Because of the small scale of nanoscale particles, they can pack tightly in the barrier. Tight packing can lead to good shielding properties since radiation is less likely to propagate between particles. This packing behavior can lead to the use of less weight of shielding material to provide sufficient electromagnetic interference (EMI) shielding. Furthermore, shielding incorporating nanoparticles can better conform to structural features of encasements, such as corners, without allowing leakage of radiation. The conducting ferromagnetic materials of the invention are conducive to the formation of smooth films with very small thicknesses.

A barrier of the invention can be a wall, or it can be geometric shape that substantially encloses a thing that can be a device, object, person, plant, or animal. A barrier can be a plane, a cube, a hemisphere, or any other geometric shape. The thing enclosed or shielded by the barrier can be something that emits radiation or something that is sensitive to radiation. The term "wall" refers to a barrier that is flat or curved but that essentially blocks radiation from only one direction.

The term "substantially encloses" refers to a barrier that encloses an object on two, three, four, or more sides, as is required for the particular application.

The term "enclosure" refers to a barrier that substantially encloses a device, object, person, or other living thing. A device enclosed can be a component of an electronic apparatus. Another specific device that can be substantially enclosed is an information handling system. Another specific device substantially enclosed can be a computer or a component of a computer. A device substantially enclosed by a barrier of the invention can be a device that is producing radiation or sensitive to radiation.

The term "formaldehyde-based resin" is well known and understood in the art, and includes melamine-formaldehyde resin, phenol-formaldehyde resin, urea-formaldehyde resin, tannin-formaldehyde resin, and lignin-formaldehyde resin.

As used herein, the term "conductive" means a composition with conductivity of at least $10^{-3}$ S/cm when doped. Undoped conductive compositions can have no conductivity.

The conductive and ferromagnetic compositions of the present invention are dispersible in water-based resins. They are also dispersible in polar organic solvents.

In specific conductive ferromagnetic compositions of the present invention, the iron oxide particles are stable at a pH of about 3. In other specific conductive ferromagnetic compositions of the present invention, the iron oxide particles are stable at a pH of about 2. In other specific conductive ferromagnetic compositions of the present invention, the iron oxide particles are stable at a pH of about 1.

In specific conducting ferromagnetic compositions of the present invention, the iron oxide particles are crystalline.

In specific conducting ferromagnetic compositions of the present invention, the iron oxide particles have an average diameter of less than 1000 nm. In other specific conducting ferromagnetic compositions of the present invention, the iron oxide particles have an average diameter of less than 200 nm. In other specific conducting ferromagnetic compositions of the present invention, the iron oxide particles have an average diameter of from about 5 nm to about 50 nm. In other specific conducting ferromagnetic compositions of the present invention, they have an average diameter of from about 13 nm to about 43 nm.

Figure 1:
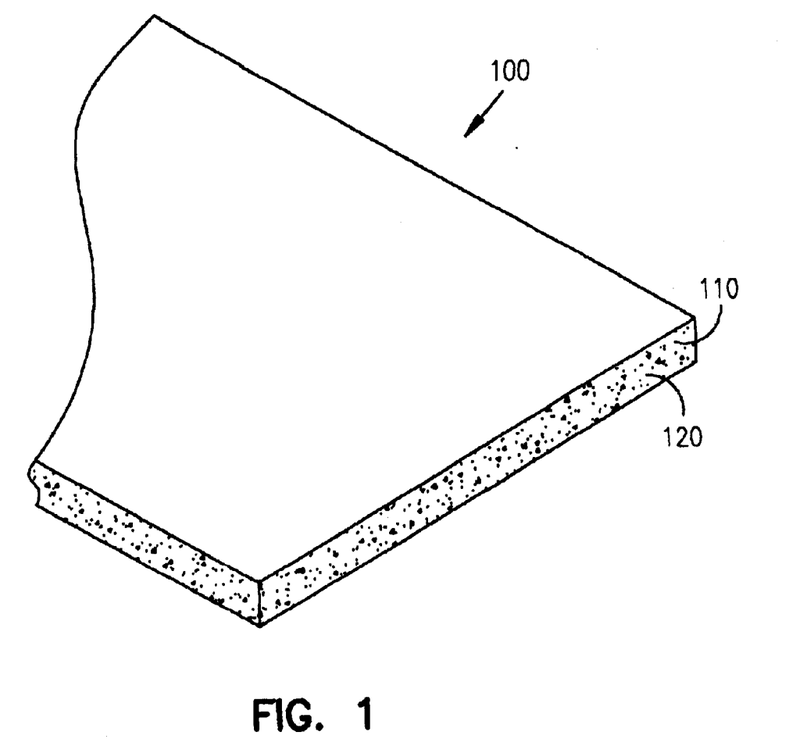
FIG. 1 is a fragmentary perspective view of a barrier.

FIG. 1 shows the barriers of the present invention. The barriers of the present invention 100 include ferromagnetic iron oxide particles 110 embedded in the conductive polymers 120 comprising (a) linearly conjugated B-systems; (b) residues of sulfonated lignin or a sulfonated polyflavonoid or a derivative of a sulfonated lignin or a sulfonated polyflavonoid. The barrier can additionally include a binder.

Figure 2:
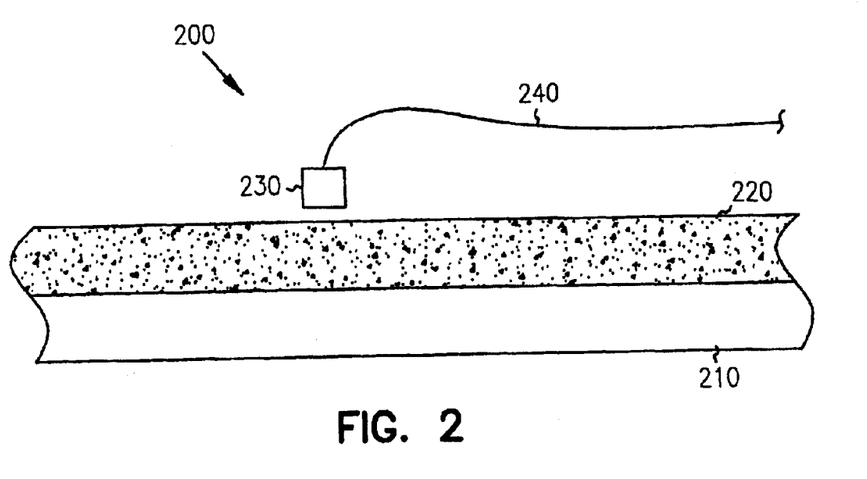
FIG. 2 is a fragmentary perspective view of an apparatus comprising a substrate and the conducting ferromagnetic material.

FIG. 2 is a view of an apparatus 200 of the invention comprising a substrate 210 and ferromagnetic layer 220 of the conducting ferromagnetic composition of the invention.

In a particular embodiment, a transducer 230 reads and writes domains of magnetization representative of data into the ferromagnetic layer. Electrical signals are transmitted to and from the transducer by an electrical connection 240.

In a specific apparatus of the invention comprising a substate and a ferromagnetic layer on the substrate, wherein the ferromagnetic layer comprises (a) linearly conjugated B-systems; (b) residues of sulfonated lignin or a sulfonated polyflavonoid or a derivative of sulfonated lignin or a sulfonated polyflavonoid; and (c) iron oxide particles, the substrate is a disc and the ferromagnetic layer stores information in magnetic domains. The disc can be a hard disc or a flexible disc. The apparatus can further comprise a transducer in transducing relationship to the ferromagnetic layer, wherein the transducer reads and writes domains of magnetization representative of data.

The apparatus with the transducer can be a disc drive, further comprising: a base, wherein the substrate is a disc and the substrate is rotatably attached to the base; and an actuator assembly movably attached to the base, wherein the transducer is affixed to the actuator assembly.

An apparatus of the invention comprising the disc drive described above can further comprise a processor, a memory operatively coupled to the processor, and an input/output subsystem operatively coupled to the processor and to the disc.

Figure 3:
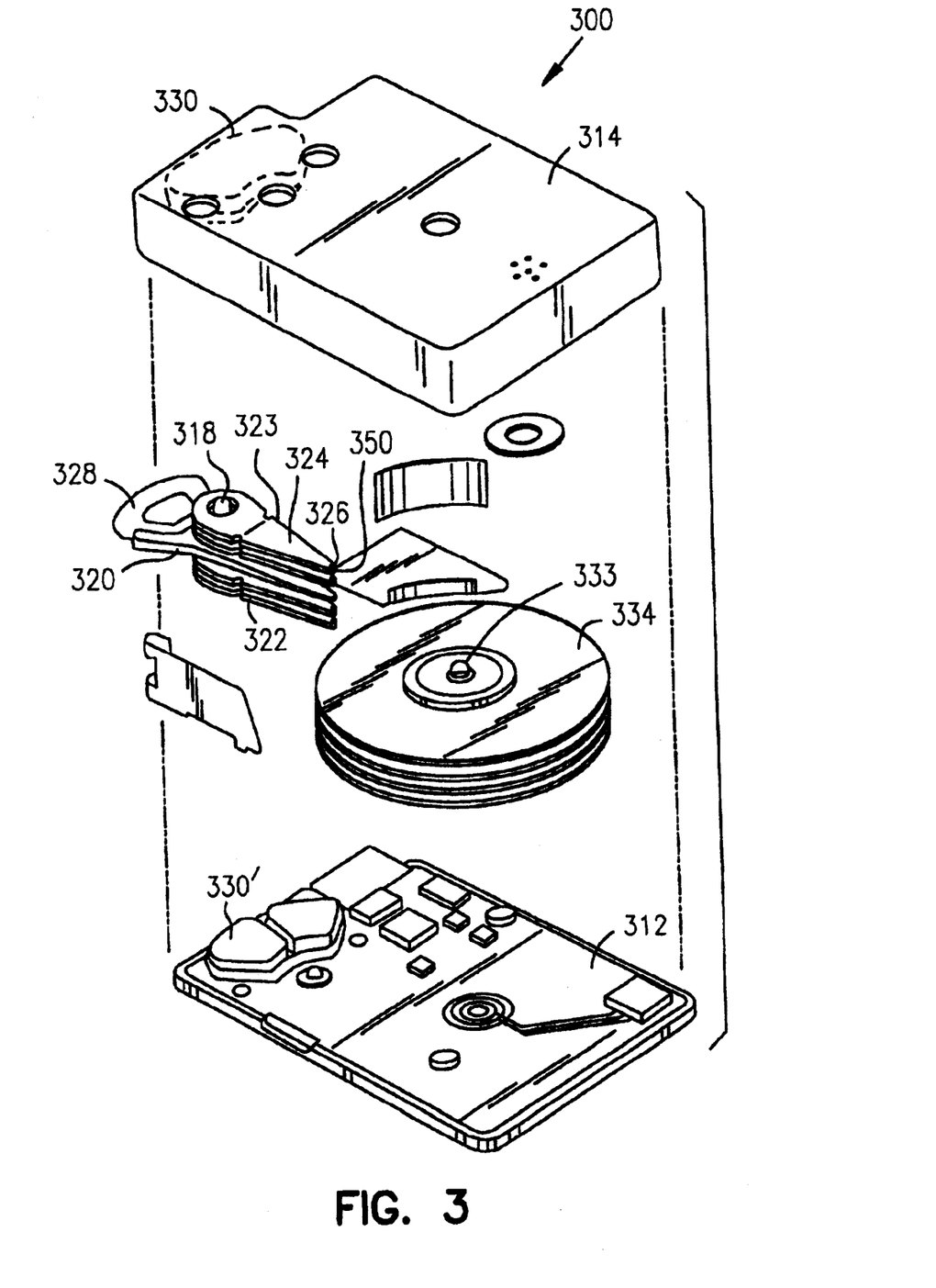
FIG. 3 is an exploded view of a disc drive with a multiple disc stack and a ramp assembly for loading and unloading transducers to and from the surfaces of the discs.

An apparatus of the invention comprising the disc drive described above can alternatively further comprise a voice coil attached to the actuator assembly, the voice coil forming a portion of a voice coil motor; and a current driver for the voice coil which determines an actual velocity of the actuator and transducer, wherein an amount of current delivered to the voice coil is determined, in part, by a force constant determined during an acceleration phase of a movement of the actuator and transducer. The disc in this apparatus can optionally be a hard disc or a flexible disc. An example of this type of apparatus is shown in FIG. 3.

The invention described in this application is useful with many electrical and mechanical configurations of disc drives having either rotary or linear actuation. In addition, the invention is also useful in all types of disc drives including hard disc drives, zip drives, floppy disc drives and any other type of disc drives where providing a low-noise current source for the transducer may be desirable. FIG. 3 is an exploded view of one embodiment of the present invention, this embodiment showing one type of a disc drive 300 having a rotary actuator. The disc drive 300 includes a housing or base 312, and a cover 314. The base 312 and cover 314 form a disc enclosure. Rotatably attached to the base 312 on an actuator shaft 318 is an actuator assembly 320. The actuator assembly 320 includes a comb-like structure 322 having a plurality of arms 323. Attached to the separate arms 323 on the comb 322, are load beams or load springs 324. Load beams or load springs are also referred to as suspensions. Attached at the end of each load spring 324 is a slider 326 which carries a magnetic transducer 350. In some embodiments, transducer 350 includes a electromagnetic coil write head and a magneto-resistive read head. The slider 326 with the transducer 350 form what is many times called the head. It should be noted that many sliders have one transducer 350 and that is what is shown in the figures. It should also be noted that this invention is equally applicable to sliders having more than one transducer, such as what is referred to as MR or magneto resistive head in which one transducer 350 is generally used for reading and another is generally used for writing. On the end of the actuator arm assembly 320 opposite the load springs 324 and the sliders 326 is a voice coil 328.

Attached within the base 312 is a first magnet 330 and a second magnet 330'. As shown in FIG. 3, the second magnet 330' is associated with the cover 314. The first and second magnets 330, 330', and the voice coil 328 are the key components of a voice coil motor which applies a force to the actuator assembly 320 to rotate it about the actuator shaft 318. Also mounted to the base 312 is a spindle motor. The spindle motor includes a rotating portion called the spindle hub 333. In this particular disc drive, the spindle motor is within the hub. In FIG. 3, a number of discs 334 are attached to the spindle hub 333. Each of the discs 334 comprises a substrate and a ferromagnetic layer, as shown in FIG. 2. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 333 or under the hub.

In other embodiments the ferromagnetic layer is used to store information in a read only medium, such as an optical disc that provides optical polarization rotations based on the inventive ferromagnetic material.

In an apparatus comprising a substrate and a ferromagnetic layer comprising (a) linearly conjugated B-systems; (b) residues of sulfonated lignin or a sulfonated polyflavonoid or a derivative of sulfonated lignin or a sulfonated polyflavonoid; and (c) iron oxide particles, the substrate can be a metal. In this case, the materials of the invention can protect the metal against corrosion. The ferromagnetic layer in this case can also further comprise a film-forming resin.

In a method for preparing a conductive ferromagnetic composition of matter comprising combining (1) a polymer comprising (a) linearly conjugated B-systems, and (b) sulfonated lignin or a sulfonated polyflavonoid or a derivative of sulfonated lignin or a sulfonated polyflavonoid; and (2) a source of ferromagnetic iron oxide particles, the polymer can be fomed by combining (a) sulfonated lignin or a sulfonated polyflavonoid or a derivative of sulfonated lignin or a sulfonated polyflavonoid, (b) one or more monomers, (c) an initiator, and (d) a solvent. The monomer can be, for example, aniline; o-ethylaniline; m-ethylaniline; o-ethoxyaniline; m-butylaniline; m-hexylaniline; m-octylaniline; 4-bromoaniline; 2-bromoaniline; 3-bromoaniline; 3-acetamidoaniline; 5-chloro-2-methoxyaniline; 5-chloro-2-ethoxyaniline; 2,5-dimethylaniline; 2,3-dimethylaniline; 2,5-dibutylaniline; 2,5-dimethoxyaniline; tetrahydronaphthylamine; 2-cyanoaniline; 2-thiomethylaniline; 3-(n-butanesulfonic acid)aniline; 2,4-dimethoxyaniline; 4-mercaptoaniline; 4-methylthioaniline; 3-phenoxyaniline; 4-phenoxyaniline; thiophene; pyrrole; or thiophenol. The initiator can be, for example, hydrogen peroxide, ferric trichloride, potassium permanganate, or potassium persulfate. The solvent can comprise or be water. In the method, the source of the iron oxide particles can be iron cations. Specifically, the source can be ferrous ions in a solvent. The solvent the ferrous ions are in can comprise or be water. Alternatively, the source of the ferromagnetic iron oxide particles can be preformed iron oxide particles.

In a method of forming a conductive ferromagnetic composition of matter comprising: combining in a mixture (1) a polymer comprising (a) linearly conjugated π-systems, and (b) sulfonated lignin or a sulfonated polyflavonoid or a derivative of sulfonated lignin or a sulfonated polyflavonoid; and (2) ferrous ions; and (3) an aqueous solvent; and adding a base to adjust the pH of the mixture to at least about 7; the pH of the mixture can also be adjusted to at least about 8, at least about 9, at least about 10, at least about 11, at least about 12, or about 12. The method can further comprise the step of heating the mixture to at least about 23° C., at least about 35° C., at least about 50° C., at least about 60° C., at least about 70° C., at least about 80° C., or about 80° C. to about 90° C. Preferably, in the heating step the mixture is not heated to boiling. The heating step can include incubation at the given temperature for at least 5 min, at least 20 min, at least 1 hour, at least 2 hours, about 2 hours, about 10 min to about 24 hours, or about 30 min to about 6 hours. The method can further comprise the steps of removing the solvent and base, and washing the composition with an acidic solution with a pH of at most about 4, at most about 3, at most about 2, about 2, about 1.6, or about 0–3

EXAMPLE 1

Experimental

Synthesis of ligno-pani. Ligno-pani was synthesized by placing 10 mL of aniline (Aldrich (distilled)) in a 400 mL beaker with 225 mL deionized water. A 10 mL sample of concentrated HCl was added to bring the solution to a pH of −1. Then 19.2 g of sodium persulfate was added to the solution to begin the polymerization at room temperature. A color change was observed after 30 sec. After 1 minute, 2.5 g of sodium lignosulfonate dissolved in 40 mL deionized water and titrated to a pH of 0 (with −50 drops of sulfuric acid) was added to the reaction mixture. The reaction was allowed to proceed for 2–3 hours. The solution was then vacuum filtered and washed with water until the filtrate was clear. A final wash was performed with 250 mL of 0.05 M hydrochloric acid. A sample of the polymer was then dried under vacuum. The remaining sample was left as a wet cake (18.7% solids).

Synthesis of ferromagnetic ligno-pani, (FLP). FLP was synthesized by dispersing 5 g of ligno-pani in 150 mL of DI water. To this mixture varying amounts of ferrous sulfate were added. The pH was then adjusted to −12 using 6 M NaOH. The solution was then stirred and heated at a temperature of 80–90EC for 2 hrs. The solution was removed and filtered. The precipitated conductive ferromagnetic material was washed with water until the filtrate was clear. A dilute solution of hydrochloric acid (pH 1.6) was used in a final wash. The samples were then dried under vacuum.

Conductivity Measurements. Conductivity values were obtained for compressed pellets using an Alessi four-point conductivity probe.

Thermogravimetric Analysis. TGA was performed on the samples using a Mettler-Toledo TG50 controlled by a PC. The samples were heated in air, raising the temperature from 35EC to 800EC at 10E/min.

XRD Analysis. Powder x-ray diffraction patterns were obtained using a Rigaku Geigerflex x-ray generator equipped with a goniometer of 22/22 geometry, graphite monochromator, and spinning sample holder. Data was collected in a step scan mode (step size 0.05E 22, 2 seconds per step, range 10E to 75E 22) using $CuK_{v1}$ radiation.

Results and Discussion

Figure 4:
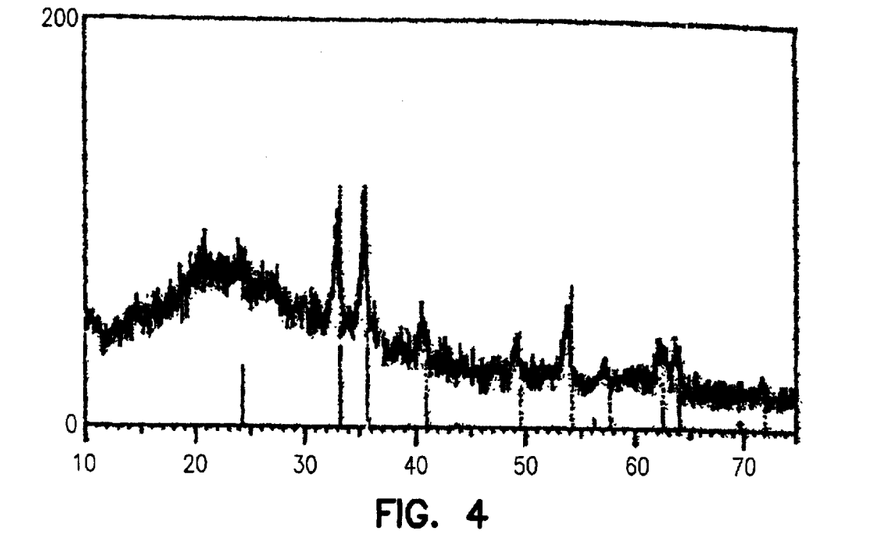
FIG. 4 shows the results of x-ray diffraction of a ferromagnetic lingo-pani sample containing $\alpha$-$Fe_2O_3$ nanoparticles.
Figure 5:
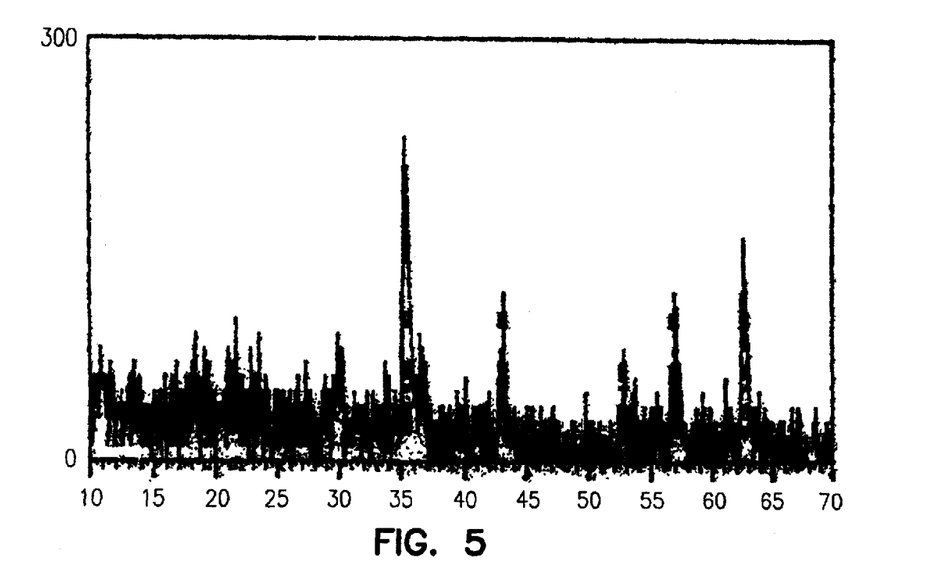
FIG. 5 shows the results of x-ray diffraction of a ferromagnetic lingo-pani sample containing magnetite nanoparticles.

FLP was synthesized using varying amounts of $FeSO_4$. As the amount of $FeSO_4$ was increased a qualitative increase in the attraction to a magnet also increased. XRD was performed on all of the samples and it was found that at low concentrations of FeSO$_4$ the nanoparticles being formed were actually ∀-Fe$_2$O$_3$ or hematite. FIG. 4 is the XRD of such a sample, made with a ratio of ligno-pani to FeSO$_4$ of 1:0.53.

The peaks occur at slightly lower angles than the card file. It was found that when the sample was removed from the auto sampler, the level of the sample was actually lower than required. This would cause the peaks to occur at slightly lower angles. The presence of the ∀-Fe$_2$O$_3$ was unexpected. It is believed that all of the ferrous ions are oxidized to ferric ions.

When higher concentrations of FeSO$_4$ were used, no evidence of ∀-Fe$_2$O$_3$ was found in the XRD pattern. FIG. 2 is the XRD of a sample synthesized with a ratio of ligno-pani to FeSO$_4$ of 1:1. This XRD indicated that the only crystalline substance is Fe$_3$O$_4$ not ∀-Fe$_2$O$_3$. It is possible, however, that the peaks for the ∀-Fe$_2$O$_3$ are buried below the noise.

To determine the percent magnetite in each of the samples, TGA was performed on each of the samples. This effectively allowed us to perform gravimetric determinations since the organic portion of the nanocomposite completely burns away at higher temperatures. The TGA conditions filly oxidize iron, so that any Fe$_3$O$_4$ would have been converted to Fe$_2$O$_3$. Percent magnetite listed in Table 1 was calculated by assuming all the iron oxide was in the magnetite form prior to TGA and was converted to Fe$_2$O$_3$ by the 800° C. heating step. Thus, the final mass measured was adjusted by assuming all the measured mass was Fe$_2$O$_3$ and had been Fe$_3$O$_4$ prior to the heating step. This adjusted final weight was divided into the initial weight to give percent magnetite. The amount of magnetite that should be in the sample based on 100% conversion of all added FeSO$_4$ was also calculated. This was used to determine the theoretical percent magnetite. Conductivity was determined for each of the samples. An interesting anomaly occurred in these calculations. The theoretical percent magnetite was lower than the actual percent observed for some samples. A possible explanation which has been alluded to earlier, is that Fe$_2$O$_3$ is also being formed. This could explain why the conductivity for B is lower than C and that of E is lower than F. The formation of the non-conducting Fe$_2$O$_3$ would serve as an insulator.

TABLE 1

Results from gravimetric determination of the percent magnetite in the sample vs. the theoretical calculation

| Sample | Ligno-Pani to FeSO$_4$ Ratio | Initial Weight (mg) | Final Weight (mg) | % Magnetite | Conductivity (S/cm) | Theoretical % Magnetite |
|---|---|---|---|---|---|---|
| A | 1:0.27 | 11.62 | 0.5 | 4.16 | 2 | 1.64 |
| B | 1:0.53 | 10.3 | 1.7 | 15.95 | 0.2 | 12.83 |
| C | 1:0.80 | 11.72 | 2.16 | 17.81 | 0.5 | 18.17 |
| D | 1:1 | 13.13 | 3.46 | 25.47 | 0.2 | 23.39 |
| E | 1:1.48 | 14.63 | 5.09 | 33.63 | 0.07 | 30.76 |
| F | 1:2 | 12 | 4.31 | 34.72 | 0.12 | 37.92 |

Crystal size is also of importance. If the crystals that are formed are too large, the composite could lose some of the special properties inherent to nanocomposites. Calculations were performed based on the Scherrer equation.

$$L = 85/\exists\cos 2$$

where L is the crystallite dimension in angstroms, K is the shape constant, ∃ is the full width at half maximum (FWHM) of the peak in radians in 22, and 2 is the angle in degrees of the peak. Instrument broadening was accounted for using a quartz standard. ∃ in the Sherrer equation can be defined as the difference between the FWHM of the sample and the standard. Crystal sizes were determined based on the (311) peak. Crystal sizes were found to be from 33 to 45 nm for the magnetite. The crystal size for the hematite in sample B was found to be 105 nm.

It was found that as the amount of FeSO$_4$ was increased, the samples became more ferromagnetic. It was also found that at a low concentration of FeSO$_4$, the pellet was attracted to a Nd magnet but not a stir bar. At higher concentrations, however, the pellets were attracted to both.

The highest conductivity obtained for the materials was 2, when prepared with a ligno-pani to FeSO$_4$ ratio of 1:0.27. This conductivity is quite high for a processable material. The highest conductivity observed for one of the composites that was also highly ferromagnetic was 0.2. Again this is fairly high considering the processability of the material.

Nanocomposites consisting of polyaniline grafted to tannin and magnetite have also been synthesized. It appears that the values for magnetic susceptibility of these samples are higher than for the ligno-pani samples. As with FLP, as the concentration of FeSO$_4$ is increased, the amount of magnetite in the sample also increases. It appears that there is also some hematite in these samples.

Nanocomposites consisting of magnetite and a polyaniline synthesized by template polymerization lignin derivatized with 2-acrylamido-2-methyl-1-propanesulfonic acid (AMPS) have also been studied. These samples appear to have better water dispersibility but otherwise appear to behave in a similar manner to the previous samples.

All references cited herein are hereby incorporated by reference.

What is claimed is:

1. A conductive ferromagnetic composition of matter comprising: (a) linearly conjugated π-systems; (b) residues of sulfonated lignin or a sulfonated polyflavonoid or a derivative of a sulfonated lignin or a sulfonated polyflavonoid; and (c) ferromagnetic iron oxide particles.

2. The composition of claim 1 wherein the composition is dispersible in water-based resins.

3. The composition of claim 1 wherein the iron oxide particles are stable at a pH of about 3.

4. The composition of claim 1 wherein the iron oxide particles are stable at a pH of about 2.

5. The composition of claim 1 wherein the iron oxide particles are stable at a pH of about 1.

6. The composition of claim 1 wherein the iron oxide particles are crystalline.

7. The composition of claim 1 wherein the iron oxide particles have an average diameter of from about 5 nm to about 50 nm.

8. The composition of claim 1 wherein the iron oxide particles are magnetite, alpha-Fe$_2$O$_3$, or gamma-Fe$_2$O$_3$.

9. The composition of claim 1 wherein the iron oxide particles are magnetite.

10. The composition of claim 1 wherein the linearly conjugated π-systems comprise polyanilines.

11. The composition of claim 1 wherein the linearly conjugated π-systems comprise polypyrroles or polythiophenes.

12. The composition of claim 1 wherein the linearly conjugated π-systems comprise repeating monomer units of aniline, thiophene, pyrrole, or phenylmercaptan, wherein the repeating monomer units of aniline, thiophene, pyrrole, or phenylmercaptan are optionally ring-substituted with one or more halo, straight or branched (C$_1$–C$_6$)alkyl, (C$_1$–C$_6$)alkoxy, or (C$_1$–C$_6$)alkoxy(C$_1$–C$_6$)alkyl groups.

13. The composition of claim 1 wherein the linearly conjugated π-systems comprise repeating monomer units selected from the group consisting of aniline; o-ethylaniline; m-ethylaniline; o-ethoxyaniline; m-butylaniline; m-hexylaniline; m-octylaniline; 4-bromoaniline; 2-bromoaniline; 3-bromoaniline; 3-acetamidoaniline; 4-acetamidoaniline; 5-chloro-2-methoxyaniline; 5-chloro-2-ethoxyaniline; 2,5-dimethylaniline; 2,3-dimethylaniline; 2,5-dibutylaniline; 2,5-dimethoxyaniline; tetrahydronaphthylamine; 2-cyanoaniline; 2-thiomethylaniline; 3-(n-butanesulfonic acid)aniline; 2,4-dimethoxyaniline; 4-mercaptoaniline; 4-methylthioaniline; 3-phenoxyaniline; 4-phenoxyaniline; thiophene; pyrrole; and thiophenol.

14. The composition of claim 1 wherein the linearly conjugated π-systems comprise repeating monomer units selected from the group consisting of aniline, o-methoxyaniline, o-ethoxyaniline, and pyrrole.

15. The composition of claim 1 wherein the linearly conjugated π-systems are grafted to the residues.

16. The composition of claim 1 wherein the residues are of sulfonated lignin.

17. The composition of claim 1 wherein the residues are of a sulfonated polyflavonoid.

18. The composition of claim 1 wherein the derivative comprises one or more hydroxy, methoxy, ethoxy, hydroxymethyl, 2-hydroxyethoxy, 2-[(N-1,1-dimethyl-2-sulfoethylamino)carbonyl]ethyl, or 2-carboxyethyl substituents.

19. The composition of claim 1 further comprising a binder.

20. The composition of claim 19 wherein the binder is a film-forming resin.

21. The composition of claim 20 wherein the composition is a latex.

22. The composition of claim 21 wherein the latex is a water-based latex.

23. The composition of claim 20 wherein the film-forming resin is selected from the group consisting of polyurethanes, epoxies, neutral resins, acidic resins, acrylics, polyesters, glycidyl acrylates, polyamides, polyimides, polyaramides, polycarbonates, polymethyl methacrylates, poly(amide-imides), polyvinyl fluorides, urea-formaldehyde, phenol-formaldehyde, melamine-formaldehyde, and combinations thereof.

24. The composition of claim 20 wherein the resin is a formaldehyde-based resin.

25. The composition of claim 20 wherein the formaldehyde-based resin is melamine-formaldehyde resin, phenyl-formaldehyde resin, or urea-formaldehyde resin.

26. The composition of claim 20 wherein the film-forming resin comprises an acrylic resin and a melamine formaldehyde resin.

27. The composition of claim 20 wherein the film-forming resin is a water-borne resin.

28. The composition of claim 20 wherein the film-forming resin is an organic-solvent-borne resin.

29. A barrier to electromagnetic radiation comprising:
(a) linearly conjugated π-systems and residues of sulfonated lignin or a sulfonated polyflavonoid or a derivative of a sulfonated lignin or a sulfonated polyflavonoid; and
(b) ferromagnetic iron oxide particles.

30. The barrier of claim 29 further comprising a binder.

31. The barrier of claim 30 wherein the binder is a film-forming resin.

32. The barrier of claim 29 wherein the barrier is applied as a thin film.

33. The barrier of claim 29 wherein the barrier is a wall.

34. The barrier of claim 29 wherein the barrier is an enclosure.

35. The barrier of claim 29 wherein the barrier substantially encloses a device.

36. The barrier of claim 35 wherein the device is a component of an electronic apparatus.

37. The barrier of claim 35 wherein the device is an information handling system.

38. The barrier of claim 35 wherein the device is a computer or a component of a computer.

39. The barrier of claim 35 wherein the device is capable of producing radiation.

40. The barrier of claim 35 wherein the device is sensitive to radiation.

41. The barrier of claim 29 wherein the barrier is a filter.

42. An apparatus comprising:
a substrate; and
a ferromagnetic layer on the substrate, wherein the ferromagnetic layer comprises (a) linearly conjugated π-systems; (b) residues of sulfonated lignin or a sulfonated polyflavonoid or a derivative of sulfonated lignin or a sulfonated polyflavonoid; and (c) iron oxide particles.

43. The apparatus of claim 42 wherein the substrate is a disc and the ferromagnetic layer stores information in magnetic domains.

44. The apparatus of claim 43 wherein the disc is a hard disc.

45. The apparatus of claim 43 wherein the disc is a flexible disc.

46. The apparatus of claim 43 further comprising:
a voice coil attached to the actuator assembly, the voice coil forming a portion of a voice coil motor; and
a current driver for the voice coil which determines an actual velocity of the actuator and transducer, wherein an amount of current delivered to the voice coil is determined, in part, by a force constant determined during an acceleration phase of a movement of the actuator and transducer.

47. The apparatus of claim 46 wherein the disc is a hard disc.

48. The apparatus of claim 46 wherein the disc is a flexible disc.

49. The apparatus of claim 43 wherein the ferromagnetic layer further comprises a film-forming resin.

50. The apparatus of claim 42 wherein the apparatus further comprises a transducer in transducing relationship to the ferromagnetic layer, wherein the transducer reads and writes domains of magnetization representative of data.

51. The apparatus of claim 42 further comprising:
a base, wherein the substrate is a disc rotatably attached to the base; and
an actuator assembly movably attached to the base, wherein the transducer is affixed to the actuator assembly.

52. The apparatus of claim 42, further comprising:
a processor;
a memory operatively coupled to the processor; and
an input/output subsystem operatively coupled to the processor and to the disc.

53. The apparatus of claim 42 wherein the substrate is a metal.

54. A method of shielding an article from electromagnetic radiation, comprising the step of interposing an electromagnetic shielding material between the article and one or more sources of electromagnetic radiation; the electromagnetic shielding material comprising: (a) linearly conjugated π-systems; (b) residues of sulfonated lignin or a sulfonated polyflavonoid or a derivative of a sulfonated lignin or a sulfonated polyflavonoid; and (c) ferromagnetic iron oxide particles.

55. The method of claim 54 wherein the shielding material further comprises a binder.

56. A method for preparing a conductive ferromagnetic composition of matter comprising combining (1) a polymer comprising (a) linearly conjugated π-systems, and (b) sulfonated lignin or a sulfonated polyflavonoid or a derivative of sulfonated lignin or a sulfonated polyflavonoid; and (2) a source of ferromagnetic iron oxide particles.

57. The method of claim 56 wherein the polymer is formed by combining (a) sulfonated lignin or a sulfonated polyflavonoid or a derivative of sulfonated lignin or a sulfonated polyflavonoid, (b) one or more monomers, (c) an initiator, and (d) a solvent.

58. The method of claim 57 wherein the monomer is selected from the group consisting of aniline; o-ethylaniline; m-ethylaniline; o-ethoxyaniline; m-butylaniline; m-hexylaniline; m-octylaniline; 4-bromoaniline; 2-bromoaniline; 3-bromoaniline; 3-acetamidoaniline; 5-chloro-2-methoxyaniline; 5-chloro-2-ethoxyaniline; 2,5-dimethylaniline; 2,3-dimethylaniline; 2,5-dibutylaniline; 2,5-dimethoxyaniline; tetrahydronaphthylamine; 2-cyanoaniline; 2-thiomethylaniline; 3-(n-butanesulfonic acid)aniline; 2,4-dimethoxyaniline; 4-mercaptoaniline; 4-methylthioaniline; 3-phenoxyaniline; 4-phenoxyaniline; thiophene; pyrrole; and thiophenol.

59. The method of claim 57 wherein the initiator is hydrogen peroxide, ferric trichloride, potassium permanganate, or potassium persulfate.

60. The method of claim 57 wherein the solvent comprises water.

61. The method of claim 57 wherein the solvent is water.

62. The method of claim 56 wherein the source of iron oxide particles is iron cations.

63. The method of claim 62 wherein the iron cations are ferrous ions in a solvent.

64. The method of claim 63 wherein the solvent comprises water.

65. The method of claim 64 wherein the solvent is water.

66. The method of claim 56 wherein the source of ferromagnetic iron oxide particles is preformed ferromagnetic iron oxide particles.

67. The conductive ferromagnetic composition of matter prepared by the method of claim 56.

68. A method of forming a conductive ferromagnetic composition of matter comprising:
   combining in a mixture (1) a polymer comprising (a) linearly conjugated π-systems, and (b) sulfonated lignin or a sulfonated polyflavonoid or a derivative of sulfonated lignin or a sulfonated polyflavonoid; and (2) ferrous ions; and (3) an aqueous solvent; and
   adding a base to adjust the pH of the mixture to at least about 7.

69. The method of claim 68 wherein the pH after adding the base is at least about 9.

70. The method of claim 68 wherein the pH after adding the base is about 12.

71. The method of claim 68 further comprising the step of heating the mixture to at least about 50° C.

72. The method of claim 71 wherein in the heating step the mixture is heated to about 80–90° C.

73. The method of claim 68 further comprising removing the solvent and base, and washing the composition with an acidic solution with a pH of at most about 4.

74. The method of claim 73 wherein the pH of the acidic solution is about 1.6.

75. A conductive ferromagnetic composition of matter prepared by the method of claim 68.

* * * * *